April 9, 1940.  F. BACHMANN  2,196,908
CLARIFICATION OF LIQUIDS
Filed Jan. 26, 1937
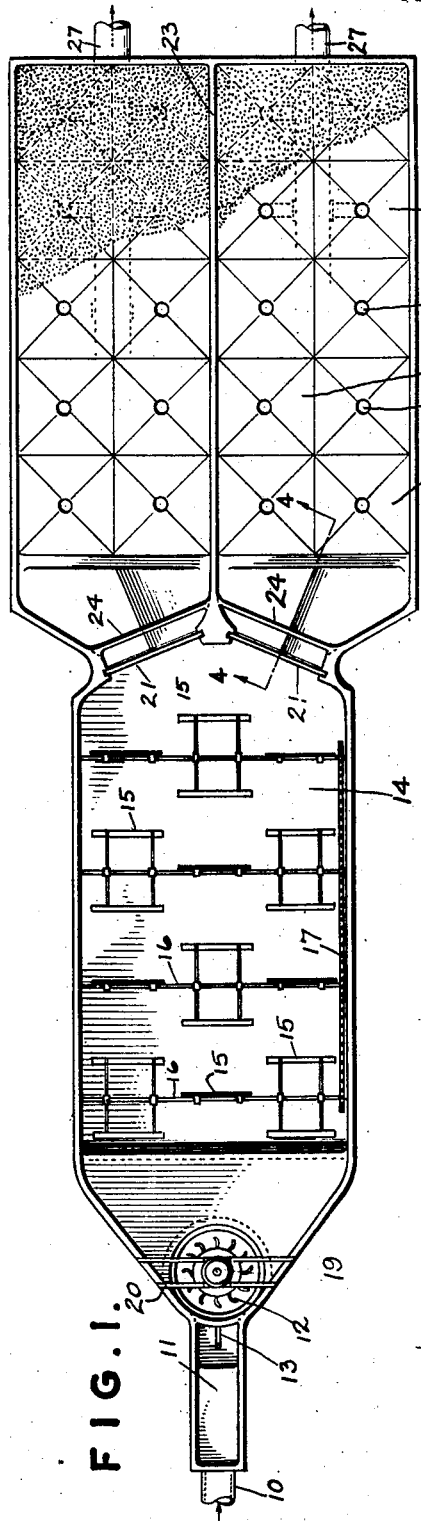
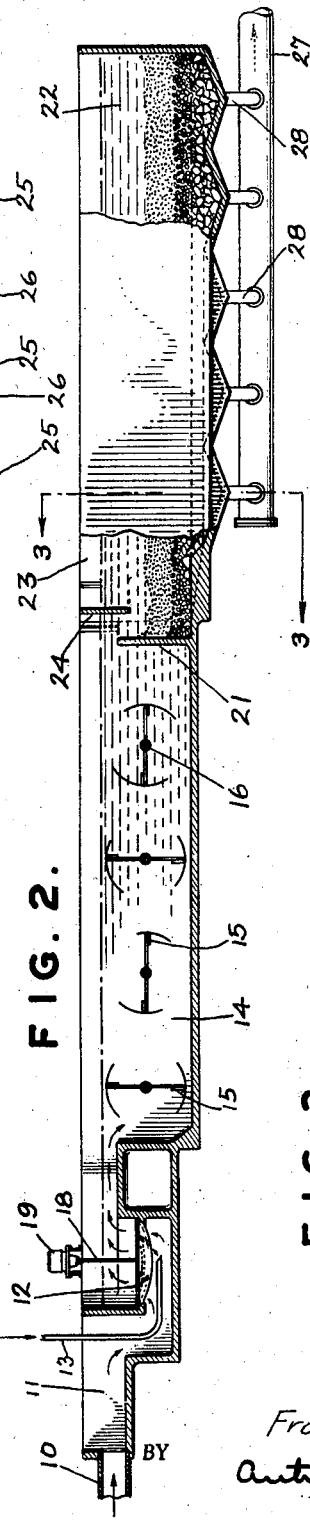
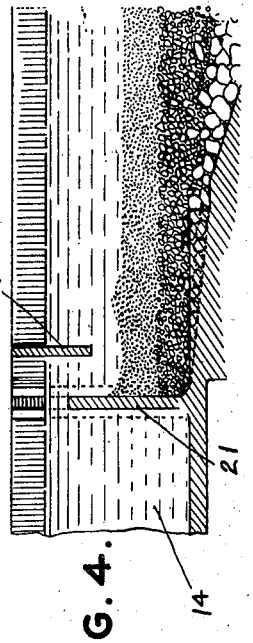
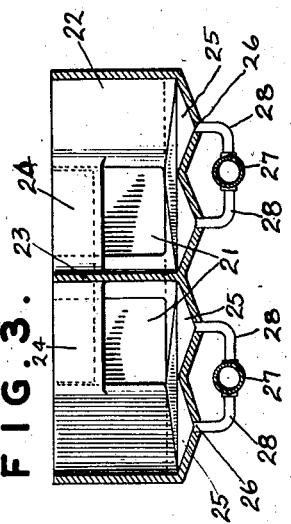
INVENTOR.
Frank Bachmann.
HIS ATTORNEY.

Patented Apr. 9, 1940

2,196,908

UNITED STATES PATENT OFFICE 2,196,908

CLARIFICATION OF LIQUIDS

Frank Bachmann, Chicago, Ill., assignor to The Dorr Company, Inc., New York, N. Y., a corporation of Delaware Application January 26, 1937, Serial No. 122,357

2 Claims. (Cl. 210—16)

This invention relates to the clarification of water in municipal or other filtration plants where water is desired to have substantially complete clarity.

Many instances are encountered where water has 50 parts of turbidity or less per million of water. Such water is reasonably clear but present day public demands require water to be clearer than that, so it is the treatment of reasonably clear water that presents a problem which this invention undertakes to solve.

This problem is met by cities taking their water from lakes and other natural water sources where ordinary water treatment plants using sedimentation basins are not justified because of their cost. So an object of this invention is to clarify water having slight but observable turbidity without the use of expensive sedimentation basins.

Sand filters are usually used under such conditions but they have the disadvantage of requiring labor for frequent cleaning. During the cleaning operation the filter bed of necessity is disused. Also, sand filters account for a relatively large consumption of alum or other coagulating agent, the expense of which constitutes a substantial item of operating cost. So another object of this invention is to improve the sand filter operation by rendering it more efficient whereby fewer cleanings thereof are required, and also whereby less alum is required to dose the water to be fed to the filter.

One of the reasons for the present degree of inefficiency of a sand filter is the penetration into the sand bed, and the consequent blinding thereof, of the finer solids as well as algae. Likewise, unreacted alum or coagulant also goes into the sand bed. So a further object of this invention is to react all of the alum with the water before the sand bed is reached thereby. Another object is to flocculate the finer solids and algae in the water into flocs of a size whereby they will be deposited and rest upon the surface of the sand bed instead of penetrating into it. If the sludge or solids can be caught more or less as a cake, layer, or blanket upon the surface of the sand bed, the sludge can be cleaned or removed readily from the sand bed, whereas if the solids penetrate the bed, the sand cleaning operation is more tedious as well as time and labor consuming. Moreover, by effecting upon the sand bed a mat or blanket of flocs, they in turn form a filter medium that is quite effective in entrapping fresh solids carried thereinto by the water descending through the filter bed, thus adding to the efficiency of the filtration functions of the sand filter itself. Heretofore, where the water was exposed to sedimentation, the larger and settleable solids were removed from the water in the settler and the effluent with non-settled fines in suspension went to the filter. So the larger solids were never available to form this mat or blanket for aiding in the entrapment of the fines and slimes.

To these ends, the benefits of this invention may be realized by associating with a sand filter bed without the interposition of a settler or clarifier, of a flocculation system whereby particles of turbidity in the water to be filtered are coagulated and coagmented or amassed into flocs. Such a system may be exemplified by a tank or basin to which is fed water dosed with a coagulant by which flocs are yielded therein. In the basin by means of induced superposed oppositely directed streams flocs tending to settle from the upper stream are caught by the lower stream and returned to the upper stream or recirculated within the same basin to bring about a maximum number of collisions between flocs and particles of turbidity. By this rolling treatment, the flocs are conditioned and coagmented. From this zone of treatment they are caused to drift or flow in a manner whereby they are not harmfully disintegrated, to the sand filter over which they are distributed. In the filter, the floc-ladened water descends to the sand bed whereupon the flocs are caught by the surface of the sand bed while the water penetrates the sand bed and clarified water passes from the filter.

With these and other objects and advantages, the invention is illustrated in the accompanying drawing showing the best embodiment of the invention now known to me, but the showing used in for the purpose of exemplification only, for obviously the invention is broad enough to assume other manifestations.

In the accompanying drawing,

Fig. 1 is a plan view of a device in which the improved method may be carried out.

Fig. 2 is a longitudinal sectional elevation, partly in section, of the structure illustrated in Fig. 1.

Fig. 3 is a section taken on the line 3—3 of Fig. 2, and

Fig. 4 is a section taken on the line 4—4 of Fig. 1.

In carrying out the improved method of clarification, the liquid, such as water of low turbidity, to be clarified, is dosed with an appropriate coagulant, such as alum, and then fed to a basin or channel wherein the particles of turbidity in the water to be filtered are coagulated and coagmented or amassed into flocs. The flocculated water is then led to a sand filter bed where it is filtered direct without sedimentation.

The water to be clarified flows from a source of supply through a pipe 10 in the direction of the arrow shown into the chamber 11. At the exit end of the chamber 11 is arranged a turbomixer 12, or other suitable combined mixing and pumping device. The turbo-mixer 12 is supported on and driven by the main drive shaft 18 of a motor 19 mounted on a bridge 20 spanning a portion of the chamber 11.

Leading into the chamber 11 is a pipe 13 through which is fed, either continually or intermittently, alum or any other suitable coagulant for dosing the water to be clarified. The exit end of the pipe 13 terminates adjacent to the turbomixer 12 and the alum or other coagulant is intimately mixed with the water to be clarified, to initiate and form floc nuclei therein as the water is drawn from the chamber 11 by the turbomixer 12.

The intimately mixed water and coagulant is then led to and through a tank 14 where it is gently but positively agitated during its passage toward the exit end of the tank.

Positive gentle agitation of the dosed water is conducive to floc coagmentation and amassment, and is performed by a plurality of paddles 15 secured to shafts 16 rotatably mounted in suitable bearings housed in the side walls of the tank 14. The shafts 16 are rotated through the medium of a sprocket chain 17 operated from any suitable source of power.

The paddles 15 are so arranged with respect to each other that currents are produced in the water being acted upon. The currents near the surface of the body of water in the tank 14 move generally toward the exit end of such tank, while the currents near the bottom of the tank move toward the entrance end of the tank. There are thus induced in the water superposed currents wherein floc coagmentation takes place.

At the exit end of the tank 14 is a dam 21. Over the top of the dam 21 the flocculated water flows to a filter tank 22. The filter tank 22 is divided into two sections by a partition 23. Also the dam 21 is divided into two parts, and associated with each part is a baffle 24 which diverts the stream of flocculated water passing over the dam 21 into the filter tank 22. Thus the water, when it reaches the filter tank 22, is practically motionless.

The sections of the filter tank 22 have their bottoms divided into a plurality of parallelly arranged units 25, the walls of each of which extend inwardly and downwardly to discharge openings 26. As shown, the units 25 are arranged in pairs of rows and to each pair of rows is assigned a pipe 27. The discharge openings 26 are connected to the pipes 27 by pipes 28.

On top of the units 25 is arranged a sand filter composed of a bottom layer of small stones 29, a layer of gravel 30, and a top layer of fine sand 31.

The flocculated water in the filter tank 22 will seep or filter through the sand filter bed. In such passage the water will be clarified and will then pass through the discharge openings 26 into the pipes 27.

The flocs in the flocculated water will progressively collect on the surface of the sand filter bed. As the floc accumulates on the filter bed it forms a mat or blanket and provides a progressively increasing initial filtering medium overlying the sand filter bed.

I claim:

1. Apparatus for the treatment of water in order to remove turbidity therefrom comprising a liquid-holding basin having therein a partial partitioning means which includes a member providing a submerged weir and which functionally divides the basin into an agitated flocculation section and a relatively quiescent filter section that is in constant hydraulic communication with the flocculation section through the medium of a constantly maintained liquid flow passageway extending past the submerged weir and by which the surface level of the liquid in said section is constantly substantially alike except for the slight difference in elevation incident to the gravity flow of liquid from the flocculation section into the filter section; means for delivering the liquid to be treated into the flocculation section; means for agitating liquid in the flocculation section in a manner conducive to floc coagmentation and amassment; a filter bed of porous filtering medium disposed within the lower portion of the filter section overlying the floor portion of the filter section and of such depth that the top of the filter bed is at an elevation lower than that of the submerged weir; and means for conducting to the exterior of the basin effluent resulting from the gravital passing of liquid downwardly through the filter bed onto the floor of the filter section.

2. Apparatus for the treatment of water according to the claim last preceding in which the feed for incoming water is provided with means for supplying a coagulating agent to the inflowing water and also with means for intimately dispersing the dosing coagulant within and throughout the water prior to the delivery of the thus dosed water into the flocculation zone.

FRANK BACHMANN.